(12) United States Patent
Depraete et al.

(10) Patent No.: US 10,274,041 B2
(45) Date of Patent: Apr. 30, 2019

(54) HYDRODYNAMIC TORQUE CONVERTER

(71) Applicant: VALEO EMBRAYAGES, Amiens (FR)

(72) Inventors: Alexandre Depraete, Bloomfield, MI (US); Xuexian Yin, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/553,257

(22) PCT Filed: Mar. 11, 2015

(86) PCT No.: PCT/IB2015/000527
§ 371 (c)(1),
(2) Date: Aug. 24, 2017

(87) PCT Pub. No.: WO2016/142732
PCT Pub. Date: Sep. 15, 2016

(65) Prior Publication Data
US 2018/0045267 A1    Feb. 15, 2018

(51) Int. Cl.
*F16F 15/12* (2006.01)
*F16H 45/02* (2006.01)

(52) U.S. Cl.
CPC ............ *F16F 15/12* (2013.01); *F16H 45/02* (2013.01); *F16H 2045/0205* (2013.01); *F16H 2045/0226* (2013.01); *F16H 2045/0231* (2013.01); *F16H 2045/0263* (2013.01); *F16H 2045/0273* (2013.01); *F16H 2045/0278* (2013.01)

(58) Field of Classification Search
CPC ................. F16H 2045/0273; F16H 2045/0263
See application file for complete search history.

(56) References Cited

U.S. PATENT DOCUMENTS

| 7,191,879 | B2 | 3/2007 | Arhab et al. |
| 8,276,723 | B2 | 10/2012 | Verhoog et al. |
| 9,605,729 | B2 | 3/2017 | Kawahara |
| 2013/0205944 | A1 | 8/2013 | Sudau et al. |

(Continued)

FOREIGN PATENT DOCUMENTS

| DE | 10236752 A1 | 2/2004 |
| DE | 102011006533 A1 | 11/2011 |

(Continued)

*Primary Examiner* — Mark A Manley
(74) *Attorney, Agent, or Firm* — Berenato & White, LLC

(57) ABSTRACT

A hydrodynamic coupling arrangement (1), comprising an impeller (6) linkable to a drive shaft, a turbine (7) linkable to a driven shaft via a hub (11) and able to hydrodynamically coupled with the impeller (6), a lockup clutch (20) able to short-circuited the hydrodynamically coupling between the impeller (6) and the turbine (7), a torsional vibration damper arrangement (13;14,15) located between the lockup clutch (20) and the hub (11), said torsional vibration damper arrangement comprising an input element (16;17,47,24), an output element (17; 25,33,32) and a plurality of elastic elements (22;26) disposed between the input element and the output element, the output element of the torsional vibration damper arrangement forms a part of the hub, wherein the coupling arrangement comprises an absorber device (29) being linked in rotation to the hub, said absorber device comprising a unique resonance frequency.

17 Claims, 3 Drawing Sheets

(56) References Cited

U.S. PATENT DOCUMENTS

2014/0048371 A1* 2/2014 Rossner .................. F16H 45/02
                                                                  192/3.28
2015/0023781 A1    1/2015 Takikawa et al.
2015/0345565 A1   12/2015 Tomiyama
2016/0053878 A1*  2/2016 Amano .................. F16H 45/02
                                                                  60/338
2016/0178030 A1    6/2016 Dinger et al.

FOREIGN PATENT DOCUMENTS

| DE | 112013001087 T5 | 11/2014 |
| DE | 102014213606 A1 | 1/2015 |
| WO | WO2014123174 A1 | 8/2014 |
| WO | WO2014132906 A1 | 9/2014 |

* cited by examiner

HYDRODYNAMIC TORQUE CONVERTER

CROSS-REFERENCE TO RELATED APPLICATIONS AND CLAIM TO PRIORITY

This application is a national stage application of International Application No. PCT/IB2015/000527 filed Mar. 11, 2015, the disclosure of which is incorporated herein by reference and to which priority is claimed.

BACKGROUND OF THE INVENTION

1. Field of the Invention

The present invention generally relates to hydrodynamic coupling arrangement.

2. Description of the Related Art

Generally, vehicles with automatic transmissions are equipped with a hydrokinetic torque coupling device for fluidly coupling the driving shaft of an engine to a driven shaft of a transmission.

It is known a hydrodynamic torque converter comprising an impeller, a turbine and a lockup clutch. Lockup clutches are known for mechanically coupling the driving and driven shafts under certain operating conditions. Lockup clutches and their operation are described in, for example, U.S. Pat. Nos. 8,276,723 and 7,191,879.

The hydrodynamic torque converter may comprises also a torsional vibration damper arrangement which is located between the lockup clutch and a hub connected to a transmission shaft. Such hydrodynamic torque converter is described in the DE 10 2014213 606 A1. The vibration damper arrangement forms an input element, an output element and elastic organs which are disposed between the input element and the output element of the torsional vibration damper arrangement.

The hub forms a piece on which the turbine is connected for transmission of the torque from the engine side to the transmission side. The hub forms a cylindrical inner part which is intended to be directly connected to the transmission shaft and a cylindrical outer part which forms a disk element. The disk element extends radially with regard to the rotation axis of the transmission shaft. The disk of the hub forms the output element of the torsional vibration damper arrangement. The turbine is connected to this central disk element.

Even such hydrodynamic torque converter provides satisfactory results, it needs to improve performance, in particular to absorb more vibrations.

BRIEF SUMMARY OF THE INVENTION

It is an object of the present invention to provide a hydrokinetic torque coupling device which present better damping vibration performance.

The object of the invention is to provide a hydrodynamic coupling arrangement, comprising
 an impeller linkable to a drive shaft,
 a turbine linkable to a driven shaft via a hub and able to hydrodynamically coupled with the impeller,
 a lockup clutch able to short-circuited the hydrodynamically coupling between the impeller and the turbine,
 a torsional vibration damper arrangement located between the lockup clutch and the hub, the torsional vibration damper arrangement comprising an input element, an output element and a plurality of elastic elements disposed between the input element and the output element, the output element of the vibration damper arrangement formed integrally with the hub. The term "integral" (or "integrally") relates to a part made as a single part, or a part made of separate components fixedly (i.e., non-moveably) connected together.

The hydrodynamic coupling arrangement further comprises—an absorber device being non-moveably connected to the hub, the absorber device comprising a unique resonance frequency.

In an embodiment of the invention, the absorber device is linked to the output element of the vibration damper arrangement.

In an embodiment of the invention, the absorber device and the turbine are connected together.

In an embodiment of the invention, the absorber device is located between the vibration damper arrangement and the turbine.

In an embodiment of the invention, the absorber device comprises a primary component, a secondary component and a plurality of elastic organs located between the primary component and the secondary component in such a way that it is generated a force which is contrary to the rotation of the secondary component with regards to the primary component.

In an embodiment of the invention, the secondary component links the primary component to the hub.

In an embodiment of the invention, the vibration damper arrangement comprises two dampers which are positioned in series one with regards to the other.

In an embodiment of the invention, the primary component is located axially between one of the dampers and the turbine.

In an embodiment of the invention, the secondary component is formed by two plates linked together to define at their external periphery a circumferential housing for receiving the elastic organs, one of these two plates being linked to the hub.

In an embodiment of the invention, each of the plates of the secondary component comprises tabs, an elastic organ being located circumferentially between the said tabs, the primary component comprises openings able to receive the elastic organ, the primary component and the secondary component cooperate the one with the other with the elastic organ being intended to be compressed between the two components.

In an embodiment, each plates comprises at its external periphery radial tabs and axial tabs, the two plates of the secondary component are arranged with a same elastic organ which is located circumferentially between two sets of radial tabs and two axial tabs.

In an embodiment of the invention, the hub forms a one piece design.

In an embodiment of the invention, the hub comprises four parts, the first one is formed by a central part which is intended to be connected to the driven shaft, the second part and the fourth part extends radially with regards to the first part and being spaced apart axially one from the other, at least the fourth part forming the outpart element of the torsional vibration damper arrangement.

In an embodiment of the invention, the absorber device is linked to the second part of the hub.

In an embodiment of the invention, the turbine is linked to the second part of the hub.

In an embodiment of the invention, the torsional vibration damper arrangement comprises a first damper and a second damper which are disposed in series one with regards to the other and which acts in series to transmit torque.

In an embodiment of the invention, the first and the second dampers are positioned radially one inside the other.

In an embodiment of the invention, each damper is formed by at least one guiding ring, a flange and a phasing member, a plurality of springs being disposed between the guiding ring and the flange, the phasing member being rotationally free placed between at least two springs.

In an embodiment of the invention, the first damper comprises one guiding ring and a first flange, the second damper comprises two guiding rings and a second flange, the first flange forming one of the two guiding rings of the second damper.

In an embodiment of the invention, there is a stator between the impeller and the turbine.

Another object of the invention is to provide a hydrodynamic coupling arrangement, comprising
an impeller linkable to a drive shaft,
a turbine linkable to a driven shaft via a hub and able to hydrodynamically coupled with the impeller,
a lockup clutch able to short-circuited the hydrodynamically coupling between the impeller and the turbine,
a torsional vibration damper arrangement located between the lockup clutch and the hub, said torsional vibration damper arrangement comprising an input element, an output element and a plurality of elastic elements disposed between the input element and the output element, the output element of the vibration damper arrangement is linked to the hub,
an absorber device being linked in rotation to the hub, said absorber device comprising a unique resonance frequency, wherein the hub and the output element of the damper arrangement form a one piece design, i.e., formed integrally with one another.

In an embodiment of the invention, the absorber device is linked to the output element and to the turbine together.

An other object of the invention is to provide a hydrodynamic coupling arrangement, comprising
an impeller linkable to a drive shaft,
a turbine linkable to a driven shaft via a hub and able to hydrodynamically coupled with the impeller,
a lockup clutch able to short-circuited the hydrodynamically coupling between the impeller and the turbine,
a torsional vibration damper arrangement located between the lockup clutch and the hub, said torsional vibration damper arrangement comprising an input element, an output element and a plurality of elastic elements disposed between the input element and the output element, the output element of the vibration damper arrangement is linked to the hub, the damper comprising two dampers units which are disposed in series one with regards to the other and which acts in series to transmit torque,
an absorber device being linked in rotation to the hub, said absorber device comprising a unique resonance frequency and an inertial mass, wherein the inertial mass being axially located in regards to the damper which is the farthest from the rotation axis of the hydrodynamic coupling arrangement.

The absorber device comprises two components and elastic organs between the two components, one of the components forms the inertial mass and the other component links the inertial mass to the hub.

BRIEF DESCRIPTION OF THE DRAWINGS

The present invention will be described in detail in the following with the reference to the accompanying drawings in which.

DETAILED DESCRIPTION OF THE PRESENTLY PREFERRED EMBODIMENTS

Figure 1:
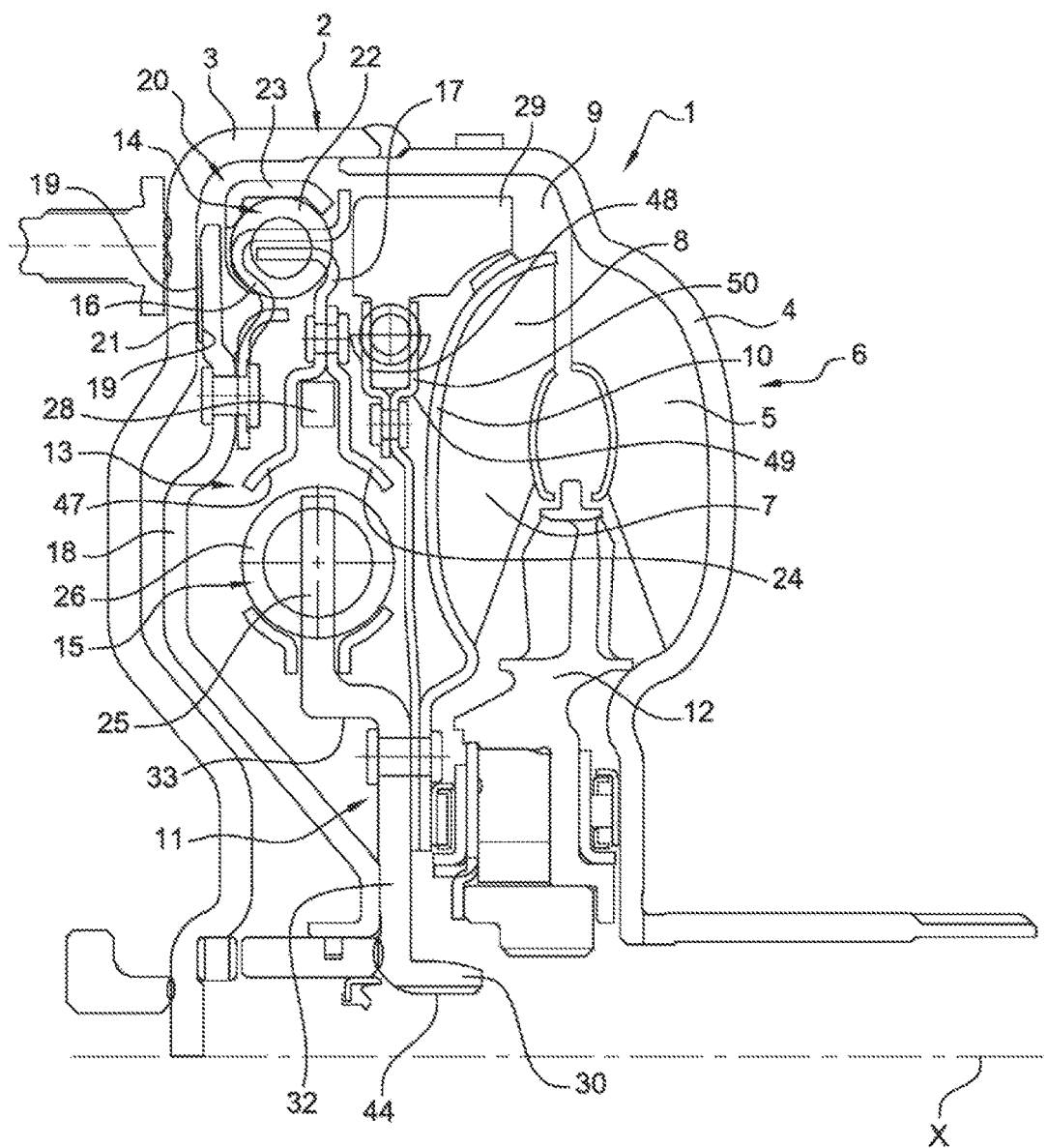
FIG. 1 is a partial longitudinal sectional view through a hydrodynamic coupling arrangement constructed as hydrodynamic torque converter.

FIG. 1 shows a hydrodynamic coupling arrangement 1 constructed as a hydrodynamic torque converter. The coupling arrangement 1 comprises a housing arrangement 2 with a first carter 3 and a second carter 4. The first carter 3 is to be connected on the drive side, i.e. facing a drive unit, and therefore for rotation together therewith and a second carter 4 which is to be positioned on the driven side, i.e., facing a transmission. The two carters 3, 4 are fixedly (i.e., non-moveably) connected to one another in their radially outer area by welding or by other fixing means. A plurality of impeller blades 5 arranged consecutively around an axis of rotation X are provided at an inner side of the second carter 4 so that the carter 4 with these impeller blades 5 form an impeller 6. A turbine 7 having turbine blades 8 which are positioned so as to face the impeller blades 4 is provided in an interior space 9 of the housing arrangement 2.

The turbine 7 comprises a turbine shell 10 which is fixedly (i.e., non-moveably) connected in its radially inner area, for example, by riveting, to a hub 11.

A stator 12 is positioned between the impeller 6 and the turbine 7. The stator 12 is supported on a hollow shaft (not illustrated) so as to be rotatable in one direction around the axis of rotation X.

A torsional vibration damper arrangement 13 comprises two torsional vibration dampers 14,15 which are positioned radially one inside the other and which act in series to transmit torque between the housing arrangement 2 and the transmission.

The radially outer torsional vibration damper 14 which is the first torsional vibration damper in the torque path comprises a guiding ring 16 which forms the input of the torsional vibration damper arrangement 13. The input of this first torsional vibration damper is connected to a piston 18 which comprises a friction area 19. This friction area 19 forms a plate or a driven-side of a lockup clutch 20. The housing arrangement 2 in its interior face forms locally an another friction area 21 or a drive-side. The piston 18 presses the two friction areas 19 and 21 into mutual frictional engagement to engage the lockup clutch 20 so that direct torque transmission coupling is produced between the housing arrangement 2 and the torsional vibration damper arrangement 13.

The first torsional vibration damper 14 comprises also a flange 17 or the outpart of this first torsional vibration damper 14. Damper elements 22 act between the guiding ring 16 and the flange 17. These dampers elements can form helicoïdal compression springs or the like which are consecutively arranged in circumferential direction. A phasage member 23 could be inserted between two damper elements and freely rotative between these two damper elements. Such a torsional vibration damper 14 with the phasage member 23 is usually named LTD (or Long Travel Damper). In this example, the damper elements are disposed on a same diameter but it could be considered that the damper elements could be on a different diameter.

The second torsional vibration damper 15 comprises a guiding ring 47 and a cover disk 24 which are fixedly connected to one another by riveting or the like. The guiding ring 47 is the same piece as the flange 17 of the first torsional vibration damper 14. Another flange 25 forms the output of the second torsional vibration damper 15. The guiding ring 47 and the cover disk 24 are rotatable with respect to the flange 25 against the action of a second damper elements 26. As for the first damper element 22, the second damper element 26 can form helicoïdal compression springs or the like which are consecutively arranged in circumferential direction. In the example according to FIG. 1, the second damper element 26 is bigger than the first damper element 22. A phasage member 28 is provided also for this second torsional vibration damper 15 to form another LTD. As for the first torsional vibration damper 14, in this example, the damper elements are disposed on a same diameter but it could be considered that the damper elements could be on a different diameter.

The flange 25 forms a part of the hub 11. The hub 11 forms a one piece design.

According to the invention, in addition to the torsional vibration arrangement 13, it is foreseen an absorber device 29. This absorber device 29 may be constructed for example as fixed frequency mass dampers and is not generally located in the torque path but rather are coupled to torque transmitting component assemblies and accordingly receive torsional vibrations and suppress them by generating a counter vibration of the torsional vibration absorber.

The absorber device 29 is linked in rotation to the hub 11 on which the turbine 10 is intended to be connected. The absorber device 29 is also connected to the output of the torsional vibration arrangement 13.

In the illustrated example FIG. 1, the hub 11 comprises four parts. The first part 30 forms a cylindrical element which is intended to be directly connected, via inner teeth 44, to the transmission shaft (no illustrated). The fourth part is formed by the flange 25 of the second torsional vibration damper 15. The second part 32 and the flange 25 extend radially with regards to the first part 30 and each forms circular plane part. The second part 32 and the flange 25 are axially spaced apart by the third part 33. In FIG. 1, the third part 33 extends axially between the two parts 32 and 25. The second part 32 is the part on which are connected together the turbine 10 and the absorber device 29. The second part 32, the third part 33 and the flange 25 form the output of the torsional vibration arrangement 13.

Figure 2:
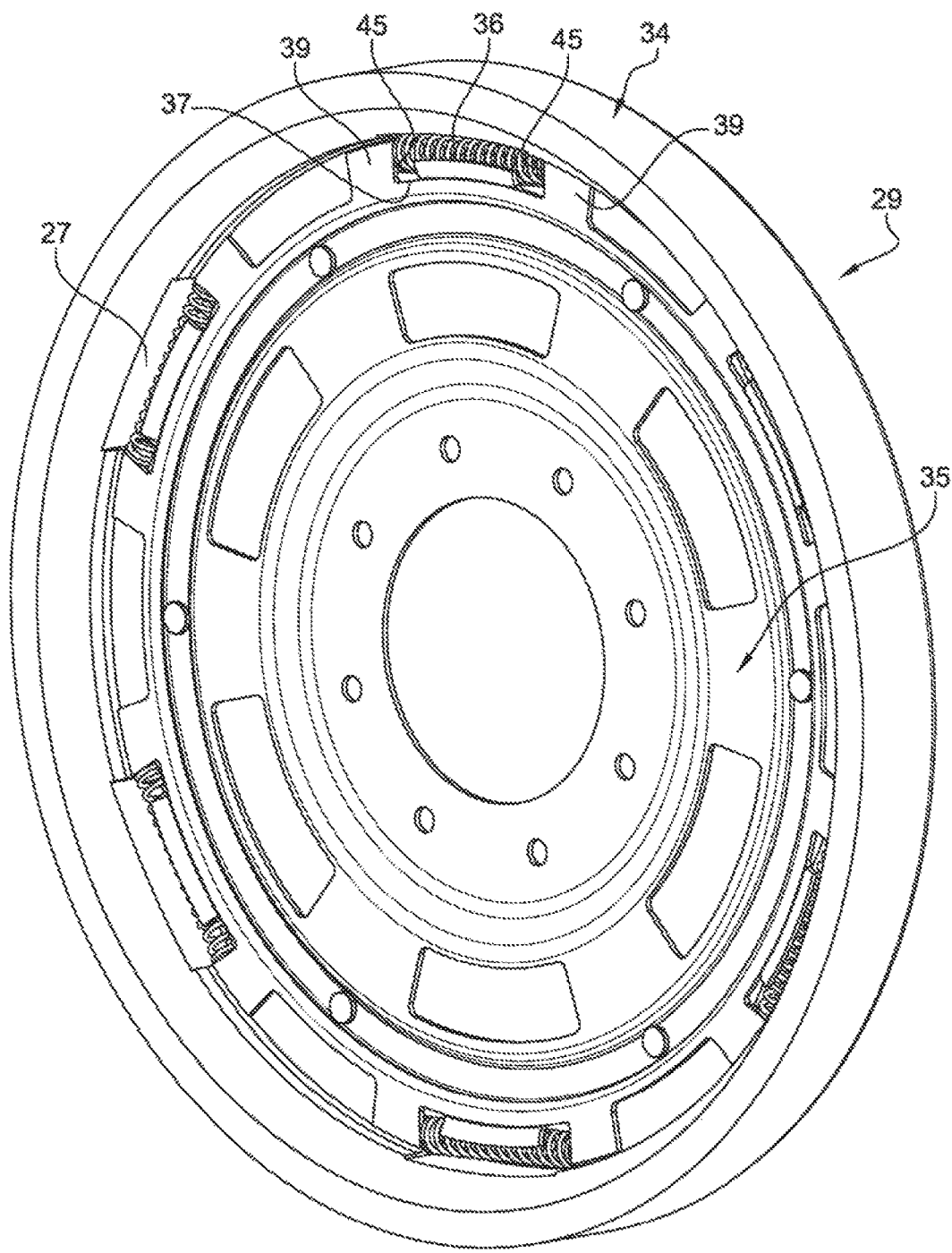
FIG. 2 is a perspective view of an absorber device according to one aspect of the invention.

FIG. 2, the absorber device 29 comprises a primary component 34, a secondary component 35, and a plurality of elastic organs (or components) 36 located between the primary component 34 and the secondary component 35 in such a way that it is generated a force which is contrary to the rotation of the secondary component 35 with regards to the primary component 34.

The primary component 34 and the secondary component 35 present complementary forms such as to define between them housings 37 for receive the elastics organs 36 which can be right springs as illustrated.

The primary component 34 forms an inertial mass which extends axially with regard to the rotation axis X and a part which extends radially with regard to this same axis. The inertial mass is located radially outside of the elastics organs 36. In the example, the inertial mass is axially aligned with regards to the damper element 22. The primary component 34 comprises also openings 27 being intended to receive at least one elastic organ 36.

Figure 3:
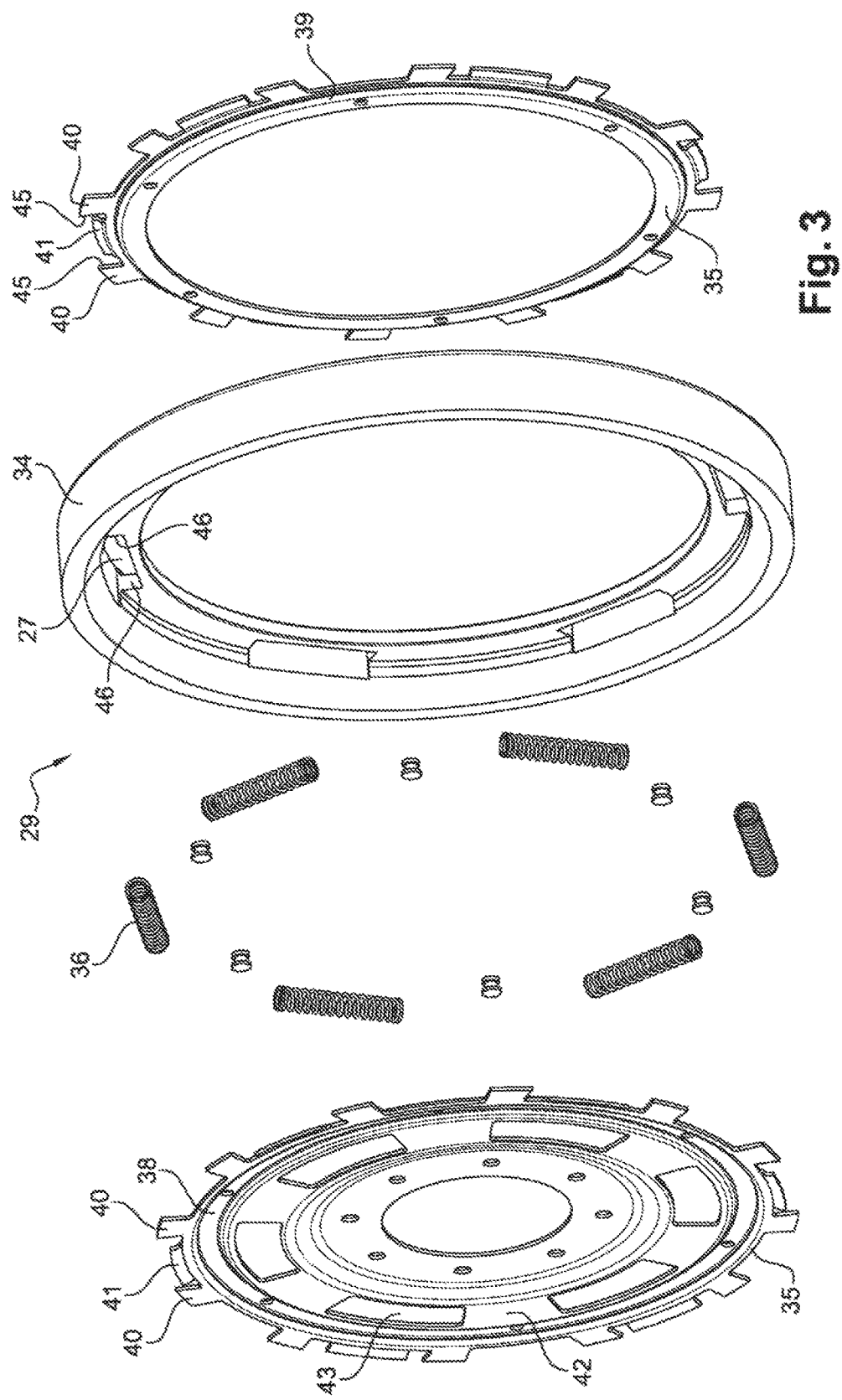
FIG. 3 is an exploded view of the absorber device of the FIG. 2.

FIG. 3, the secondary component 35 is formed by a first plate 38 and a second plate 39 which are connected the one to the other.

The first plate 38 as the second plate 39 forms at its external periphery an annular ring 48,49 with radial tabs 40 and axial tabs 41. The radial tabs 40 extend radially outward whereas the axial tabs extend radially and axially outward. The radial tabs 40 of the two plates are superimposed together in such a way that circumferentially between them are inserted the elastic organs 36, such as springs. The axial tabs 41 maintain axially the springs 36.

The annular rings 48 and 49 of respectively the first plate 38 and second plate 39 are disposed the one with regards to the other to define between them a space 50 in which is located the radial part of the primary component 34. In the example, the radial part of the primary component fills all the space 50. But it could be considered that it fills only a part of the space 50.

The first plate 38 presents a central annular part 42 comprising windows 43 to clear space near the springs 26 of the second torsional vibration damper 15. This first plate 38 is fixedly connected at the inner area of the central annular part 42 to the second part 32 of the hub 11. The turbine 10 is also fixedly connected at its inner area near the rotation axis X to the second part 32 of the hub 11. The first plate 38 and the turbine 10 are fixedly connected together to the second part of the hub 11.

In the example, six springs 36 are angularly disposed between the primary component 34 and the secondary component 35. A sole spring modeling the whole springs 36 of the absorber device 29 forms for example a angularly stiffness coefficient is comprised between 0.36 and 36 Nm/°. In a preferred embodiment, the stiffness coefficient is 2.3 Nm/°. Each radial tab 40 defines two opposite radials faces 45. Each opening 27 comprises also two radial faces 46. The primary component 34 and the secondary component 35 cooperate together in such a way that each spring 36 is located between a radial face 45 and a radial face 46.

The primary component 34 is rotative with regards to the secondary component 35 with a limited rotative movement due to the presence of the springs 36. The rotation range of the primary component 34 with regards to the secondary component 35 is in this example comprised between 10° and 18°. In a preferred embodiment, the rotation of the primary component 34 with regards to the secondary component 35 is of 14°.

As illustrated in the FIGS. 1 to 3, the primary component 34 extends radially outwardly with regard to the secondary component 35. The primary component 34 defined a mass which presents for example an inertia comprises between 0.0013 and 0.1335 kg·m². In a preferred embodiment, the inertia of the primary component mass is 0.021 kg·m².

The invention claimed is:

1. A hydrodynamic coupling arrangement (1), comprising—an impeller (6) connectable to a drive shaft,
a turbine (7) connectable to a driven shaft via a hub (11) and configured to be hydrodynamically coupled with the impeller (6),
a lockup clutch (20) configured to short-circuit the hydrodynamically coupling between the impeller (6) and the turbine (7),
a torsional vibration damper arrangement (13, 14, 15) located between the lockup clutch (20) and the hub (11), the torsional vibration damper arrangement comprising an input element (16), an output element (25, 33, 32) and a plurality of elastic elements (22; 26) disposed between the input element and the output element, the output element of the torsional vibration damper arrangement formed integrally with the hub as a one-piece part, an absorber device (29) comprising a unique resonance frequency, a portion of the absorber device (29) being fixedly connected to the hub, the hub comprising four parts:

a first part (30) formed by a central part intended to be connected to the driven shaft, a second part (32) radially outwardly extending from the first part, a third part (33) axially extending from the second part and is axially spaced from the first part, and a fourth part (25) radially outwardly extending from the third part, wherein at least the fourth part forming the output element of the torsional vibration damper arrangement.

2. The hydrodynamic coupling arrangement according to claim 1, wherein the absorber device and the turbine are fixedly connected together.

3. The hydrodynamic coupling arrangement according to claim 1, wherein the absorber device is located between the torsional vibration damper arrangement and the turbine.

4. The hydrodynamic coupling arrangement according to claim 1, wherein the absorber device comprises a primary component (34), a secondary component (35) and a plurality of elastic components (36) located between the primary component and the secondary component in such a way that a force is generated, which is contrary to the rotation of the secondary component with regards to the primary component.

5. The hydrodynamic coupling arrangement according to claim 4, wherein the secondary component connects the primary component to the hub.

6. The hydrodynamic coupling arrangement according to claim 4, wherein the torsional vibration damper arrangement comprises two dampers (14,15) which are positioned in series one with regards to the other, the primary component is located axially between one of the dampers and the turbine.

7. The hydrodynamic coupling arrangement according to claim 4, wherein the secondary component is formed by two plates (38, 39) connected together to define at their external periphery a circumferential housing (37) for receiving the elastic components, one of these two plates being fixedly connected to the hub.

8. The hydrodynamic coupling arrangement according to claim 7, wherein each of the plates of the secondary component comprises tabs (40,41), an elastic component (36) being located circumferentially between the tabs, the primary component comprises openings (27) able to receive the elastic component, the primary component and the secondary component cooperate the one with the other with the elastic component being intended to be compressed between the two components.

9. The hydrodynamic coupling arrangement according to claim 8, wherein each of the plates comprises at an external periphery thereof radial tabs (40) and axial tabs (41), the two plates of the secondary component are arranged with a same elastic component which is located circumferentially between two sets of the radial tabs and the two axial tabs.

10. The hydrodynamic coupling arrangement according to claim 1, wherein the absorber device is fixedly connected to the second part of the hub.

11. The hydrodynamic coupling arrangement according to claim 1, wherein the turbine is fixedly connected to the second part of the hub.

12. The hydrodynamic coupling arrangement according to claim 1, wherein the torsional vibration damper arrangement comprises a first damper (14) and a second damper (15) which are disposed in series one with regards to the other and which acts in series to transmit torque.

13. The hydrodynamic coupling arrangement according to claim 12, wherein the first and the second dampers are positioned radially one inside the other.

14. The hydrodynamic coupling arrangement according to claim 12, wherein each damper is formed by at least one guiding ring (16;47,24), a flange (17;25) and a phasing member (23;28), a plurality of springs (22;26) being disposed between the guiding ring and the flange, the phasing member being rotationally free placed between at least two springs.

15. The hydrodynamic coupling arrangement according to claim 14, wherein the first damper (14) comprises one guiding ring (16) and a first flange (17), the second damper (15) comprises two guiding rings (47,24) and a second flange (25), the first flange (17) forming one (47) of the two guiding rings (47,24) of the second damper (15).

16. The hydrodynamic coupling arrangement according to claim 2, wherein the absorber device and the turbine are connected together.

17. The hydrodynamic coupling arrangement according to claim 4, wherein the secondary component of the absorber device is fixedly connected to the hub.

* * * * *